United States Patent [19]

Harner et al.

[11] 3,932,058

[45] Jan. 13, 1976

[54] CONTROL SYSTEM FOR VARIABLE PITCH FAN PROPULSOR

[75] Inventors: Kermit I. Harner, Windsor; Roy W. Schneider, Ellington, both of Conn.

[73] Assignee: United Technologies Corporation, Hartford, Conn.

[22] Filed: June 7, 1974

[21] Appl. No.: 477,532

[52] U.S. Cl. .................... 416/28; 416/29; 416/30; 60/39.16 R; 60/39.28 R; 60/226 A; 60/236; 60/239

[51] Int. Cl.²... B63H 3/10; F02C 9/02; B64C 11/44

[58] Field of Search ......... 60/226, 226 A, 262, 269, 60/39.25; 416/25, 29, 28, 27, 30; 244/53 B, 77 D

[56] References Cited
UNITED STATES PATENTS

| | | |
|---|---|---|
| 3,686,860 | 8/1972 | White .............................. 60/39.25 |
| 3,761,042 | 9/1973 | Denning ........................... 60/226 R |
| 3,797,233 | 3/1974 | Webb et al ....................... 60/226 R |
| 3,854,287 | 12/1974 | Rembold ........................... 60/238 |

*Primary Examiner*—Clarence R. Gordon
*Attorney, Agent, or Firm*—John D. Del Ponti

[57] ABSTRACT

A control for a variable pitch fan propulsor driven by a turbine type of power plant which fan is mounted in an engine bypass duct having a variable exit nozzle. The control serves to coordinate the control of fuel flow to the engine, the area of the fan exit nozzle, and the pitch of the fan blades by biasing the power lever position signal with Flight Mach No. An additional feature is the inclusion of fan surge control derived from signals of flight Mach No. and corrected free turbine speed.

11 Claims, 3 Drawing Figures

CONTROL SYSTEM FOR VARIABLE PITCH FAN PROPULSOR

BACKGROUND OF THE INVENTION

This invention relates to control means for an aircraft propulsor of the class known as Q-Fans$^{TM}$ being developed by the Hamilton Standard Division of United Aircraft Corporation and particularly to coordinated means for controlling the pitch of the fan blades, engine fuel flow and fan exhaust nozzle area.

To more fully understand the Q-Fan$^{TM}$, reference should be made to U.S. Pat. No. 3,747,343 granted to Mr. George Rosen and assigned to the same assignee. As is the case with all controls for gas turbine power plants, it is customary to provide means for monitoring engine operations and provide control means to convert those signals to a logic that will provide, as best and efficient as possible, optimum engine operations. Thus, the control manifests these signals to provide fast thrust response during take-off and landing, optimum TSFC (Thrust Specific Fuel Consumption) in all cruise conditions, while preventing stall or surge, rich or lean blowout, overtemperature, overpressure and overspeed conditions.

Obviously, the incorporation of such variables as variable pitch fans, variable area fan exit nozzles and the like will add complexity to the control system. The significance of this invention is to provide a reliable coordinated control that coordinates fuel flow to the gas turbine engine and pitch change of the fan blades and the area of the variable exit nozzle of the bypass duct so as to achieve rapid thrust modulation in takeoff and landing modes and optimum TSFC in all cruise and long duration flight conditions while providing the typical protection to the gas generator. In particular this invention contemplates biasing the power lever schedules with flight Mach No. to provide control of engine fuel flow, fan pitch and area of the exit nozzle in the event this variable is included. The surge of the fan is prevented by defining a scheduled exhaust nozzle area which is a function of flight Mach No. and corrected engine fan speed ($N_F/\sqrt{\theta}$) and feeding it to a selector circuit that selects the larger of the normal scheduled area and the minimum fan exit area which is required to avoid fan surge. The fan exit area nozzle is also utilized to optimize performance (TSFC) for long duration flight conditions. Except for the condition lever which is typically employed in aircraft for starting, shutting-off and feather, this invention contemplates a single power lever that is so coordinated to provide engine fuel flow, variable fan pitch change and variable area exhaust nozzle control.

This control also contemplates the aspect of reversing the pitch of the fan through feather as opposed to passing through flat or zero pitch. This presents a significant problem since the pitch of the fan just prior to reversing is at a lower positive blade angle and must move to a higher positive blade angle to reach the feather angle position. Without anything else being done the higher positive pitch will increase the blade loading and produce a higher positive thrust which is obviously undesirable inasmuch as this increases forward flight velocity where a decrease is required. Of course, once in reverse pitch, maximum reverse thrust is obtained. To achieve this end we have found means to coordinate the functions of engine fuel flow, blade angle and exhaust nozzle area so as to minimize forward thrust by judiciously reducing and increasing fuel flow and/or increasing exit fan nozzle area and optimize the transient response.

Thus, in summary, without limiting the scope of this invention the salient features are:

1. The ability to schedule optimum conditions and minimize TSFC at all thrust levels in the Mach number range where extended flight conditions are expected by coordinating fan pitch, fan exhaust nozzle area and engine fuel flow.

2. The ability to provide rapid thrust response in the takeoff and landing conditions by coordinating fan pitch and engine fuel flow so as to optimize transient response characteristics.

3. Provisions for shutting off fuel flow and feathering fan blades to prevent fan rotation and excessive drag in the event of engine malfunctions.

4. The ability to modulate thrust smoothly from maximum to near zero thrust in both the forward and reverse range on the ground.

5. Conventional acceleration and deceleration, overtemperature, overspeed and overpressure limits are incorporated into the gas generator control system to prevent operation outside of the normal envelope.

SUMMARY OF THE INVENTION

An object of this invention is to provide an improved control for a propulsor powering aircraft.

A still further object of this invention is to provide control means that coordinates fuel flow to a gas turbine engine driving a variable pitch ducted fan and the pitch of the fan.

A still further object of this invention is to provide control means that coordinates fuel flow, pitch change of the gas turbine engine driven fan and the exhaust nozzle area of the bypass duct surrounding the fan.

A still further object of this invention is to provide control for a propulsor of an aircraft which coordinates the pitch of a variable pitch fan and fuel flow to the gas turbine engine by biasing power lever position as a function of Mach No. Additionally, the control anticipates changes in fan pitch and schedule changes in fuel flow so as to minimize fan speed excursions and to optimize thrust response characteristics. The control provides additional coordinating means for controlling the area of the exit exhaust nozzle of the bypass duct housing the fan, if incorporated.

A still further object of this invention is to provide surge prevention means of the fan by controlling the area of the fan exhaust duct nozzle as a function of Mach. No. and corrected fan speed.

Other features and advantages will be apparent from the specification and claims and from the accompanying drawings which illustrate an embodiment of the invention.

DESCRIPTION OF THE PREFERRED EMBODIMENT

Figure 1:
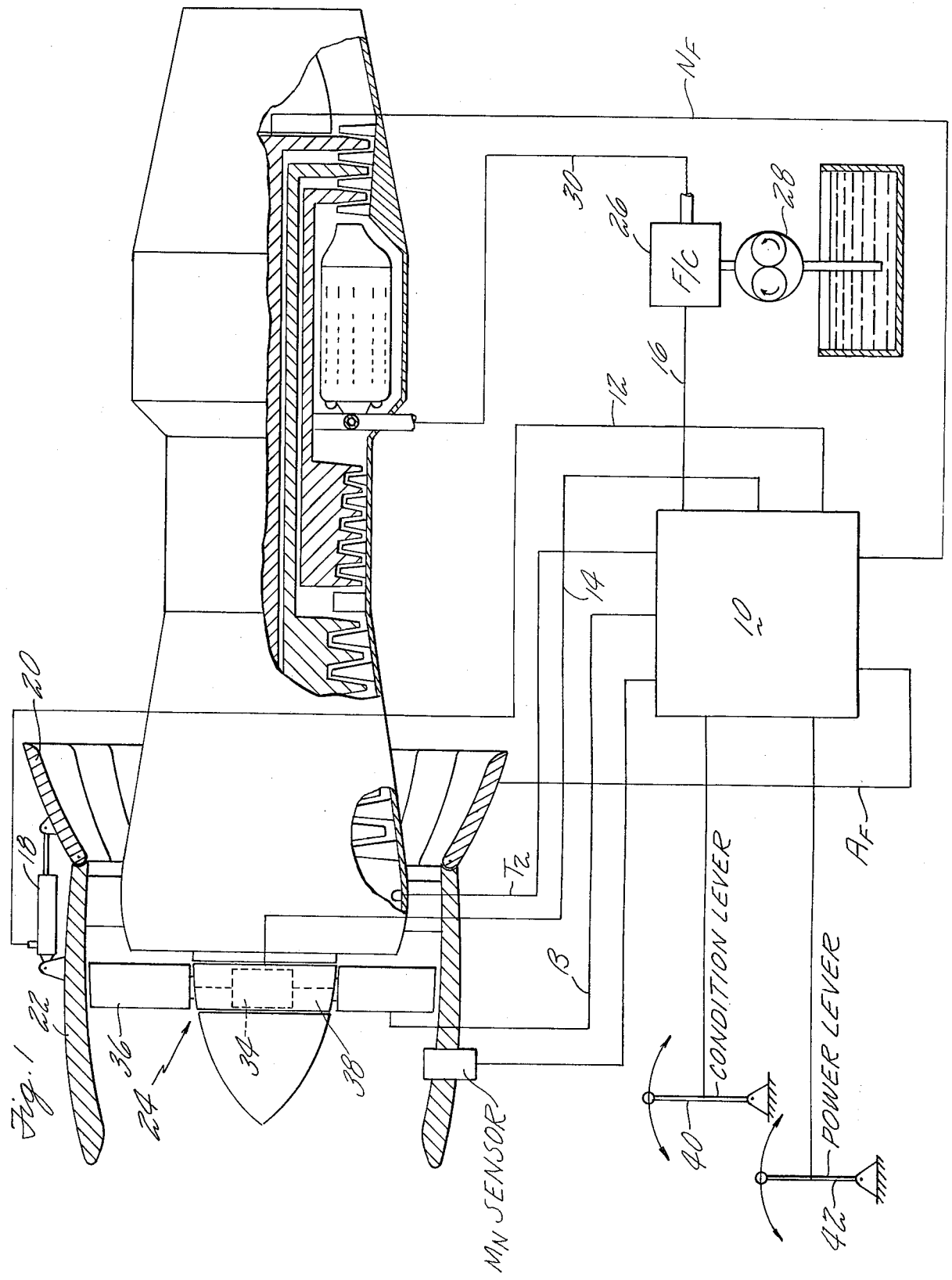
FIG. 1 is a schematic view, partly in section and partly diagrammatic illustrating the preferred embodiment.
Figure 2:
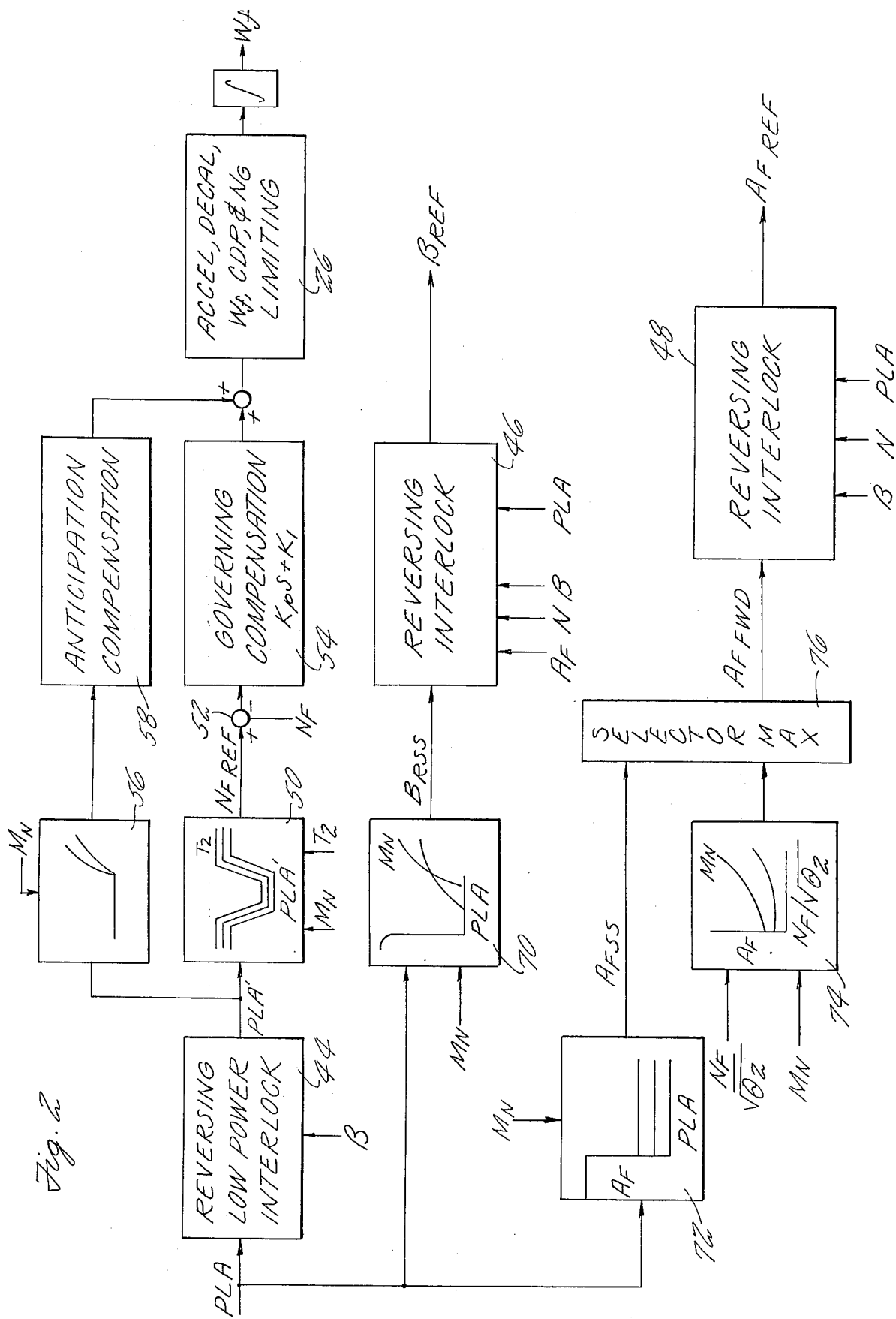
FIG. 2 is a diagrammatic illustration of this invention.

Reference is now made to FIGS. 1 and 2 which illustrate the preferred embodiment of this invention showing the coordinating control in blank referenced by numeral 10 having as schematically shown suitable connecting means 12, 14, 16 connecting the actuator 18 for the variable exhaust nozzle 20 of bypass duct 22; connecting the pitch change mechanism of the variable pitch fan generally illustrated by numeral 24; and connecting the fuel control 26, respectively.

Fuel control 26 may be any well know commercially available fuel control, such as the JFC-42-2 or the JFC-26 model manufactured by the Hamilton Standard Division of United Aircraft Corporation or the type illustrated in U.S. Pat. No. 2,822,666 granted to S. G. Best on Feb. 11, 1958 and also assigned to the same assignee suitably modified to complement this invention. Suffice it to say that the fuel control serves to meter fuel to the engine as a function of the control logic and serves to prevent surge, overtemperature and overpressurization in a well known manner. However, the control, according to the teachings of this invention, would of necessity be suitably modified to reflect the utilization of the parameters monitored by and converted into control logic by the control 10. This aspect of the invention will be more fully appreciated from the description to follow, but one skilled in this art would have no difficulty in applying the teachings of this invention to the established fuel control technology.

In the instance, the fuel control 26, receiving the control logic from the coordinated control 10 serves to meter the proper amount of pressurized fuel received from pump 28 to the burner section of the gas turbine engine via line 30. Preferably fuel control 26 will provide protection for the gas generator so as to prevent overtemperature, overtorque, overspeed and overpressure conditions, as well as avoiding surge and flame out as power is varied.

While not specifically limited thereto, as will be appreciated by one skilled in the art, the preferred embodiment contemplates a gas turbine engine having a free turbine, i.e., the free turbine is not mechanically connected to the gas generator and its sole connection is through the aerodynamic coupling of the gases which flow through the compressor and turbine sections.

The pitch change mechanism shown in blank by reference numeral 34 responding to the coordinated control 10 via connection 14, may be any suitable type and for the sake of convenience and clarity, a detailed description thereof is omitted. Suffice it to say that the pitch change mechanism serves to vary the blade angle ($\beta$) of fan blades 36 which are suitably rotatably supported in hub 38 in any well known manner. In this embodiment because of the high blade solidity factor and the response characteristics, it is contemplated that the blades are reversed through feather, although such a requirement is not germane to this invention. If, however, that is the case, it would be desirable to provide a high pitch stop, short of feather, to prevent an inadvertent feather. Such a stop would be, in concept, similar to the low pitch stop customarily provided in all propellers that are powered by gas turbine engines, as for example, the 54H60 propeller manufactured by the Hamilton Standard Division of United Aircraft Corporation.

Referring to FIG. 1 it will be appreciated that the control 10 receives signals from a pair of control levers 40 and 42, one being the condition lever which is utilized for starting, feathering, and shutting-off and the power lever, respectively. The conditioning lever and its functions are well known and since it is not deemed a part of this invention, a detailed description is omitted for the sake of convenience and simplicity.

The power lever (PLA) serves to provide the input to the control so that the control 10 will automatically set the power of the gas generator to provide the necessary aircraft operating conditions in both forward flight and reverse modes. The control 26 is designed to provide rapid thrust modulation in the takeoff and landing modes and optimum TSFC in all cruise and long duration flight conditions.

Reference will next be made to FIG. 2 which schematically describes the control logic contemplated for effectuating the above. Ignoring for the moment the reversing interlocks 44, 46 and 48, it will be noted that the power lever schedules free turbine speed ($N_F$ ref) by generating a biased signal responding to flight Mach No. ($M_N$) and compressor inlet temperature ($T_2$) in the function generator 50. Inlet temperature of the engine may be either low pressure compressor inlet temperature, high pressure compressor inlet temperature or fan inlet temperature. The actual fan speed ($N_F$) is compared with $N_F$ ref in summer 52 which signal is passed to the governing compensation network 54. Network 54 is a suitable well known proportional plus integral fan speed governor serving to modulate the fuel within the conventional fuel constraints scheduled by control 26.

It is apparent from the foregoing that $N_F$ is set as a function of PLA, $T_2$ and $M_N$ and speed governing through the proportional plus integral fan speed governor modulates fuel flow to maintain the speed eror at zero.

In order to compensate for the inertia of the gas generator turbine and compressor and obtain fast thrust response by pitch change, it is desirable to incorporate an anticipatory circuit. This anticipatory signal responding to PLA rapidly changes fuel flow relative to the slow changes in $N_F$ so as to provide the change in power needed to hold the desired speed of the fan while fan pitch is changed. This anticipatory signal which may be a suitable derivative signal, i.e., a reset which is proportional to the velocity of the input signal, minimizes fan speed excursions and helps to improve the thrust response characteristics during transient conditions.

Figure 3:
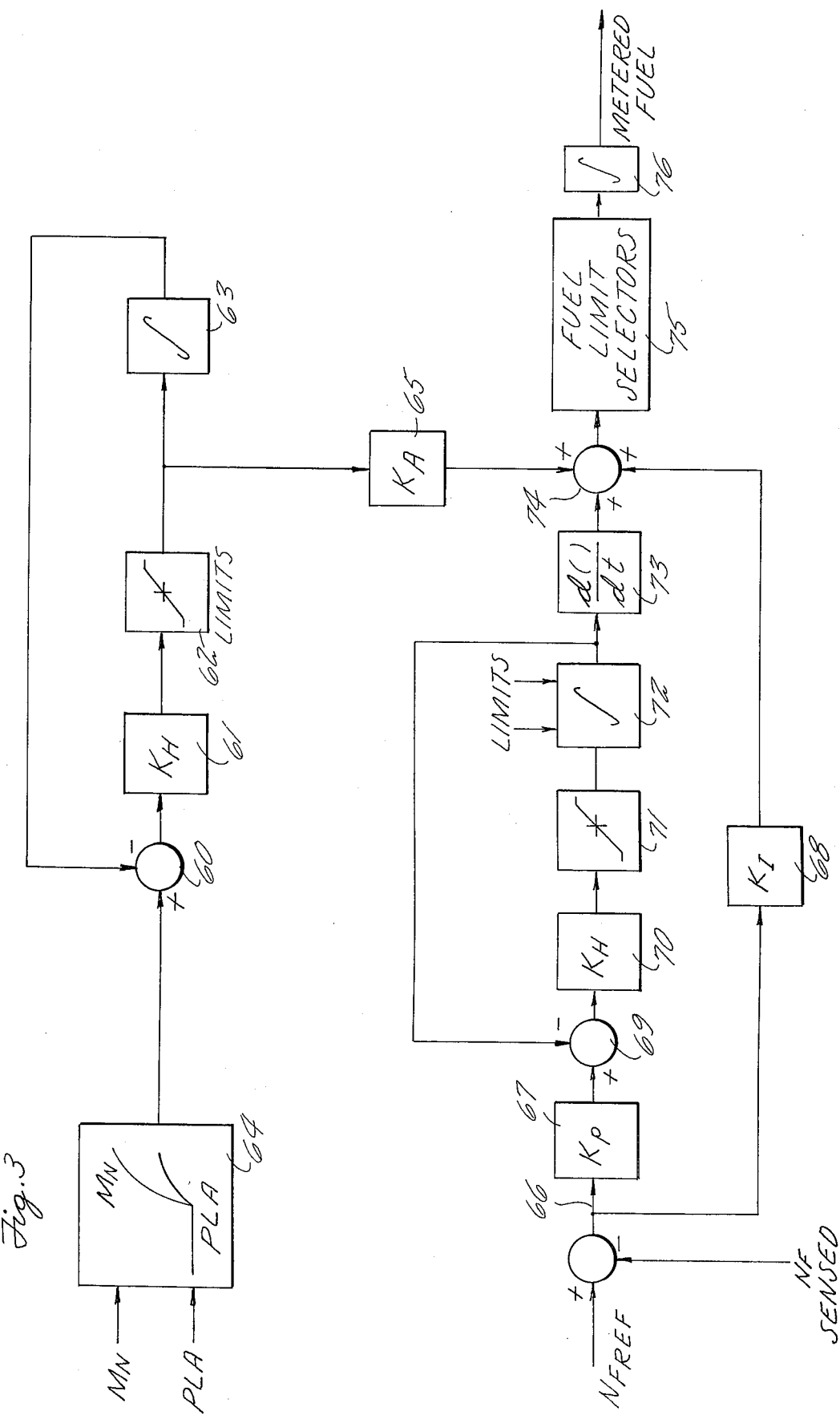
FIG. 3 is a diagrammatic illustration of the anticipation circuitry.

While a well known $$\frac{KS}{\tau S + 1}$$

type of mechanism may be employed as the anticipatory signal, FIG. 3 describes a preferred embodiment for effectuating the anticipatory function. In this instance the basic proportional and integral speed control is obtained by time integration of a derivative and proportional signal of speed error. Similarly power lever anticipation signal is obtained by time integration of a derivative signal.

In either instance, anticipation is a function of PLA and flight $M_N$, so that below a predetermined PLA and above a predetermined $M_N$ no anticipation will occur. This is represented by the curve in box 64. Thus at the point of the curve in function generator 56 where the curve becomes horizontal, the scheduled output is constant and hence no anticipation signal will ensue. It is only when the PLA reaches a predetermined value that anticipation will occur and will generate a signal which will pass to the derivator 58. The curve in the box 64 is shaped to provide anticipation only in the low $M_N$ forward thrust regime where rapid thrust modulation is required for take-off and landing.

Hence, since power lever can change very rapidly, the speed error and anticipation derivative can become very large magnitude - short time duration signals. To avoid loss of a portion of these signals due to unavoidable signal limiting these derivative signals are converted into smaller amplitude - longer duration signals. This is accomplished by providing a rate - limited first order lag and then computing the derivative of this lag output as shown in FIG. 3. The combination of summer 60, high gain 61, limits 62 and time integration 63, form a rate limited first order lag such that the output from 63 follows the anticipation signal from box 64 with a defined maximum rate. It is obvious that the derivative of the time integration may be obtained from the input to the integration, thus the signal to the integration into box 63 is also passed through the anticipation gain 65 to yield the PLA anticipation signal.

The fan speed governor is basically a conventional proportional and integral control. This is mechanized in FIG. 3 by forming the speed error 66 from the difference between $N_{F\ REF}$ and $N_{F\ SENSED}$, then passing this error signal through a proportional gain 67 and integral gain 68. A rate - limited derivative of the proportional signal is formed in essentially the same manner as used in the anticipation circuit, except that the integration 72 has magnitude limits to permit smooth transition from fuel limiting to speed governing. Specifically, the combination of 69, 70, 71, 72 form a rate-limited lag that is also magnitude limited in box 72. The derivative 73 of the box 72 output is added to the speed integral signal from box 68 and the anticipation signal from box 65 in summation 74. The output from summation 74 is a measure of the desired rate of change of engine fuel. This signal is passed to the fuel control and time integrated 76 (within the fuel constraints 75 scheduled in the fuel control) for effecting changes in metered fuel flow.

Referring back to FIG. 2, PLA and flight $M_N$ are used in function generator 70 to generate a commanded steady state fan blade angle signal, $B_{RSS}$. The fan blade angle is adjusted in a suitable manner to achieve this $B_{RSS}$.

Likewise, the PLA and flight $M_N$ are used in function generator 72 to create a commanded optimum fan exhaust nozzle area signal, $A_{FSS}$. It is apparent from the foregoing that PLA and flight $m_N$ are used to schedule fan blade angle and fan exhaust nozzle area in order to optimize performance in the normal operating regime.

In order to assure that the fan operates without excursions into the surge range the function generator 74 is provided. This schedules $A_F$ as a function of corrected $$N_F\ (N_F/\sqrt{\Theta}\ \text{where}\ \Theta = \frac{T_2}{\text{Standard value}})\ \text{and}\ M_N.$$

This generated signal, i.e., the output of function generator 74 is compared with the scheduled $A_F$ signal generated by he function generator 72 by maximum selector switch 76, permitting solely the higher of the two values to pass through, $A_{FFWD}$. The area of exhaust nozzles 20 ($A_F$) are adjusted in a suitable manner to achieve this area, $A_{FFWD}$.

Thus, by virtue of this invention fan speed, fan pitch and fan nozzle is coordinated in such a manner as to optimize TSFC in the normal flight regimes and to optimize thrust response at takeoff and landing modes. The control minimizes complexities by being compatible with existing types of controls that already have provision for preventing surge, overtemperature, include acceleration and deceleration schedules and have overpressure and overspeed limits necessary for gas turbine engine operation.

As was emphasized above, by virtue of this requirement of reversing through feather, the fan in order to accomplish this feature would increase thrust until feather position is reached as well as increasing the torque on the fan driving shaft. This, obvious, is counter to what is necessary for good braking characteristics that are desired for optimum short aircraft landing performance.

Thus, in order to obtain rapid reverse thrust without exceeding shaft torque limits and minimize any increased forward thrust excursions, the fan pitch, fuel flow and fan exhaust nozzle area are coordinated during the transition to reverse thrust. To this end, interlocks 44, 46 and 48 are included in the speed, blade angle and nozzle area circuitry. The interlock 44 includes a fan pitch ($\beta$) override, interlock 46 includes fan exhaust nozzle area ($A_F$), fan speed ($N_F$), fan pitch ($\beta$), and power lever angle (PLA) overrides and interlock 48 includes fan pitch, fan speed and power lever angle overrides so as to perform the following control logic.

When reverse thrust is requested by retarding the power lever angle to the reverse thrust range, the fan pitch is scheduled to go to its reverse pitch and fan nozzle area is scheduled to the reverse position. In order to minimize the increased thrust and shaft torque transient which results from increasing fan pitch, fan exhaust nozzle area is opened as rapidly as possible and fan speed reference is decreased which causes engine fuel flow to decrease to the deceleration limit. During this initial time interval fan pitch is either held fixed for a short time or allowed to increase at some relatively slow rate until the exhaust nozzle area has opened to a prescribed value and fan speed has decreased sufficiently to minimize the increased thrust transient. After the fan pitch has increased past the feather angle, the blades are allowed to go to their scheduled reverse angle at maximum rate and the $N_F$ reference is restored to its normal scheduled reverse thrust speed.

The unreversing coordination of engine fuel flow, fan pitch and exhaust nozzle area need be slightly different to prevent fan overspeed and excessive shaft torque in the feather region. When unreversing thrust is requested by advancing the PLA to the forward thrust regime, the fan pitch is scheduled to go to its forward pitch position, and the fan nozzle area is scheduled to the position associated with forward thrust. The fan pitch is decreased to forward pitch as rapidly as possible, and the nozzle area is delayed at reverse area position to avoid fan surge in the feather region. The PLA signal, as used in function generators 50 and 56, is temporarily reset to a lower power to avoid fan overspeed and excessive shaft torque while the fan pitch is moving from reverse to forward pitch. The PLA schedule returns to normal, and the exhaust nozzle area is allowed to move to the forward area position after the fan pitch has passed through the feather region.

While not specifically limited thereto, the preferred embodiment comtemplates the execution of the concept disclosed herein by use of well known digital type of electronic controllers.

It should be understood that the invention is not limited to the particular embodiments shown and described herein, but that various changes and modifications may be made without departing from the spirit or scope of this novel concept as defined by the following claims.

We claim:

1. A control system for a turbine type of power plant powering a variable pitch propulsor of the type that is closely coupled to the power plant and is supported in a duct bypassing the power plant, said control system including coordinating means for controlling the pitch of the propulsor and the flow of fuel to the power plant, said coordinating means being responsive to a scheduled value of speed derived as a function of flight Mach. No., power plant inlet temperature, power lever position and actual power plant rotational speed for controlling fuel flow to the power plant and being responsive to said flight Mach. No. and said power lever position to synchronously control the pitch of the propulsor.

2. A control system as claimed in claim 1 wherein said coordinating means includes means for ascertaining a value indicative of the difference between actual power plant rotational speed and the power lever position biased by flight Mach No. and power plant inlet temperature.

3. A control system as claimed in claim 1 including means anticipating a change in said power lever position to further adjust fuel flow.

4. A control system as claimed in claim 3 wherein said anticipating means is responsive to flight Mach No.

5. A control system as claimed in claim 4 wherein said anticipation means produces an output signal which is a time integration of a derivative signal.

6. A control system as claimed in claim 5 wherein said derivative signal of anticipation means is the derivative of the output of the rate-limited first order lag of the power lever change input signal.

7. For a ducted fan propulsor having variable pitch blades and driven by a free turbine of a turbine type power plant, coordinated control means for controlling the pitch of said blades and the flow of fuel to said power plant, said coordinated control means for controlling fuel flow includes scheduling means responsive to power lever position, flight Mach No. and another engine parameter for producing a first signal, means responsive to free turbine speed for producing a second signal, means responsive to said first signal and said second signal for producing an output signal for controlling fuel flow and said coordinated control means for controlling pitch of the blades being responsive to power lever position and flight Mach No.

8. For a ducted fan propulsor as claimed in claim 7 wherein said other engine parameter is inlet temperature of said power plant.

9. For a ducted fan propulsor having variable pitch blades driven by a free turbine of a turbine type power plant and variable area duct exit nozzle coordinated control means for controlling the pitch of said blades and the flow of fuel to said power plant and the area of said nozzle, said coordinated control means for controlling fuel flow includes scheduling means responsive to power lever position, flight Mach No. and another engine parameter for producing a first signal, means responsive to free turbine speed for producing a second signal, means responsive to said first signal and said second signal for producing an output signal for controlling fuel flow, said coordinated control means for controlling pitch of the blades being responsive to power lever position and flight Mach No., and said coordinated control means being responsive to flight Mach No. and power lever position for producing a scheduled signal for controlling the area of said nozzle.

10. For a ducted fan propulsor as claimed in claim 9 including means for further controlling said nozzles to prevent surge by scheduling the surge limit as a function of flight Mach No. and corrected free turbine speed.

11. For a ducted fan propulsor as claimed in claim 10 including a selector for selecting the maximum of the value of said scheduled surge signal and the value of said scheduled nozzle area signal.

* * * * *